(12) United States Patent
Jayaraman

(10) Patent No.: US 12,682,164 B2
(45) Date of Patent: Jul. 14, 2026

(54) CHAT SUPPORT PLATFORM HAVING AUTOMATIC KEYWORD CORRECTION

(71) Applicant: Truist Bank, Charlotte, NC (US)

(72) Inventor: Barath Jayaraman, Charlotte, NC (US)

(73) Assignee: Truist Bank, Charlotte, NC (US)

( * ) Notice: Subject to any disclaimer, the term of this patent is extended or adjusted under 35 U.S.C. 154(b) by 370 days.

(21) Appl. No.: 18/192,699

(22) Filed: Mar. 30, 2023

(65) Prior Publication Data

US 2024/0330585 A1    Oct. 3, 2024

(51) Int. Cl.
*G06F 40/232* (2020.01)
*G06F 40/166* (2020.01)
*G06F 40/268* (2020.01)
*G06F 40/279* (2020.01)
*G06Q 30/02* (2023.01)

(52) U.S. Cl.
CPC .......... *G06F 40/232* (2020.01); *G06F 40/166* (2020.01); *G06F 40/268* (2020.01); *G06F 40/279* (2020.01); *G06Q 30/0281* (2013.01)

(58) Field of Classification Search
CPC .... G06F 40/232; G06F 40/166; G06F 40/268; G06F 40/279; G06Q 30/0281
See application file for complete search history.

(56) References Cited

U.S. PATENT DOCUMENTS

| | | | | | |
|---|---|---|---|---|---|
| 6,047,300 | A | * | 4/2000 | Walfish | G06F 40/232 |
| | | | | | 715/257 |
| 7,827,125 | B1 | * | 11/2010 | Rennison | G06F 16/906 |
| | | | | | 706/14 |
| 9,037,967 | B1 | * | 5/2015 | Al-Jefri | G06F 40/232 |
| | | | | | 715/257 |
| 2005/0210383 | A1 | * | 9/2005 | Cucerzan | G06F 40/232 |
| | | | | | 715/257 |
| 2006/0123329 | A1 | * | 6/2006 | Steen | G06F 40/253 |
| | | | | | 715/764 |
| 2009/0100160 | A1 | * | 4/2009 | Bowerman | G06F 15/173 |
| | | | | | 709/223 |
| 2010/0325539 | A1 | * | 12/2010 | Nedzlek | G06F 16/93 |
| | | | | | 715/257 |
| 2012/0284308 | A1 | * | 11/2012 | Paduroiu | G06F 40/232 |
| | | | | | 707/E17.014 |
| 2013/0325884 | A1 | * | 12/2013 | Soel | G06F 40/194 |
| | | | | | 707/E17.058 |

(Continued)

OTHER PUBLICATIONS

Hodge, V. J., & Austin, J. (2002). A comparison of a novel neural spell checker and standard spell checking algorithms. Pattern Recognition, 35(11), 2571-2580. (Year: 2002).*

*Primary Examiner* — Bhavesh M Mehta
*Assistant Examiner* — Philip H Lam
(74) *Attorney, Agent, or Firm* — Jordan IP Law LLC; Michael A. Springs, Esq.

(57) ABSTRACT

A computing device, a computer program product, and a computer-implemented method for delivering enhanced financial services and, more particularly, for facilitating a virtual chat communication session between a user and a virtual support agent which automatically identifies and corrects keywords which the user may misspelled. A pre-stored list of valid keywords is maintained and is used to identify which keywords are misspelled. Misspelled keywords may be automatically corrected.

20 Claims, 12 Drawing Sheets

(56)                     References Cited

U.S. PATENT DOCUMENTS

| | | | |
|---|---|---|---|
| 2015/0067486 A1* | 3/2015 | Hochman | G06F 40/274 |
| | | | 715/257 |
| 2016/0019549 A1* | 1/2016 | Maizuddin | G06Q 30/016 |
| | | | 705/7.42 |
| 2018/0089315 A1* | 3/2018 | Seiber | G06F 16/639 |
| 2018/0260406 A1* | 9/2018 | Wan | G06F 40/232 |
| 2020/0045364 A1* | 2/2020 | Tulis | H04N 21/4314 |
| 2022/0019736 A1* | 1/2022 | Ouyang | G06F 40/166 |
| 2024/0330587 A1* | 10/2024 | Swerdlow | G06F 40/232 |

* cited by examiner

Figure 7:
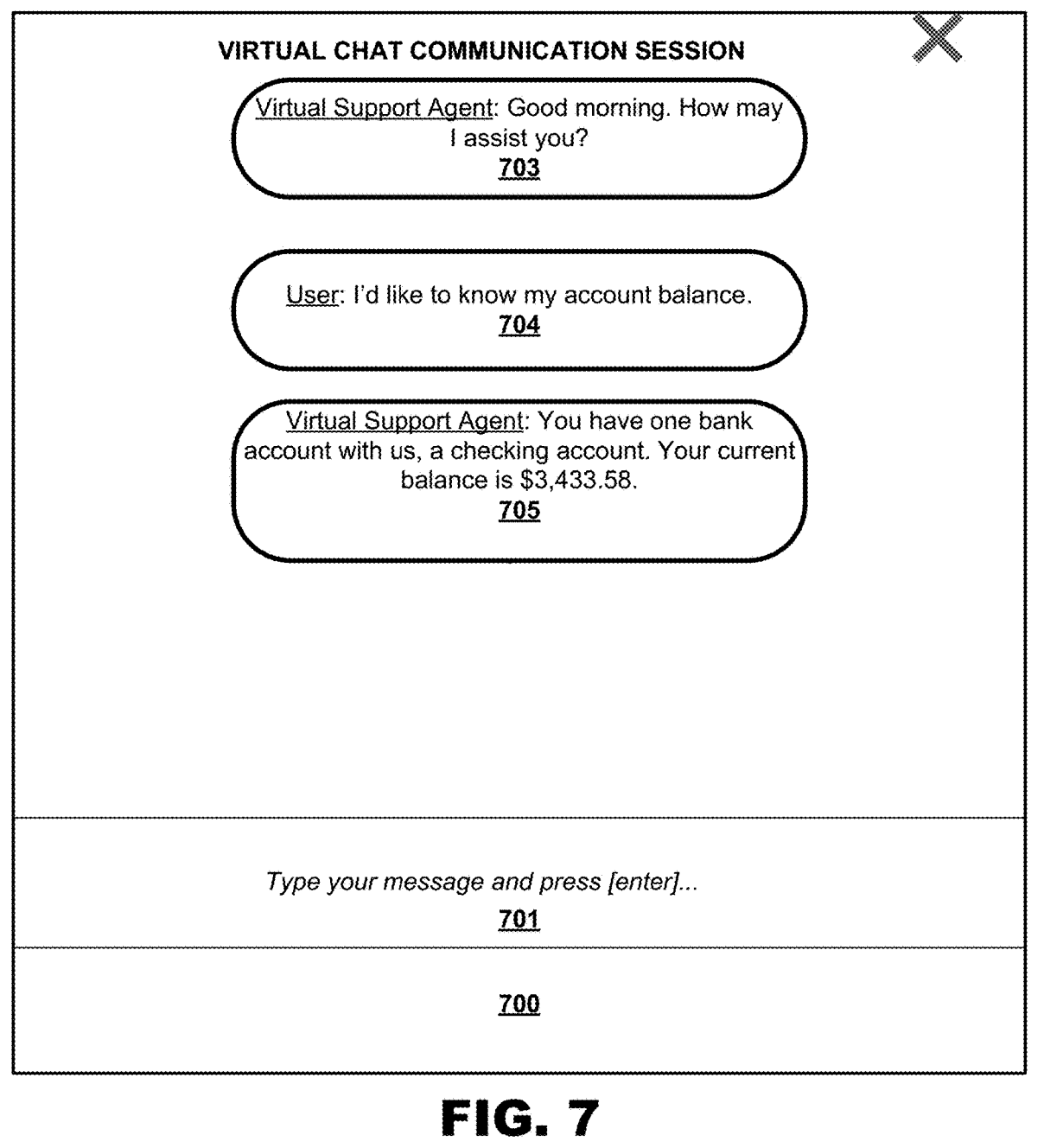

VIRTUAL CHAT COMMUNICATION SESSION

Virtual Support Agent: Good morning. How may I assist you?
703

User: I'd like to know my account balance.
704

Virtual Support Agent: You have one bank account with us, a checking account. Your current balance is $3,433.58.
705

*Type your message and press [enter]...*
701

VIRTUAL CHAT COMMUNICATION SESSION

Virtual Support Agent: Good morning. How may I assist you?
1201

User: Please change the setting for the minimum number of matching letters to be 8
1202

Virtual Support Agent: OK. That setting is now changed for all of your future chat sessions
1203

*Type your message and press [enter]...*
701

700

CHAT SUPPORT PLATFORM HAVING AUTOMATIC KEYWORD CORRECTION

TECHNICAL FIELD

The present disclosure relates to a computing device, computer program product, and computer-implemented method for delivering digital financial services and, more particularly, for a virtual chat communication platform that facilitates keyword correction when a user enters an incorrect keyword.

BACKGROUND

Financial institutions that provide financial services are increasingly providing a greater number of client services. In order to alleviate call and chat density from customers over a network environment, such client services include automated virtual support agents (e.g., chatbots) who supplement human virtual support agents by directly interacting with customers via text chat, phone, instant messaging, etc.

SUMMARY

The present disclosure relates to a computing device, a computer program product, and a computer-implemented method for delivering enhanced digital financial services over a communication network by providing a digital financial management platform for a client device that includes a virtual chat communication platform that facilitates automatic detection and correction of misspelled keywords.

In accordance with one or more embodiments set forth, illustrated and described herein, an apparatus may comprise one or more processors; and a non-transitory memory coupled to the one or more processors, the non-transitory memory including a set of instructions of computer-executable program code, which when executed by the one or more processors, causes the apparatus to, receive, from a client device of a user during a virtual chat communication session between a virtual support agent of a financial institution on a chat interface visually displayed on a user interface of the client device of a user executing a mobile application or desktop application associated with the financial institution over a communication network, a command; detect, contemporaneously with the virtual chat communication session a misspelled keyword in the command; determine, contemporaneously with the virtual chat communication session in response to the detection, a candidate keyword out of a plurality of pre-stored keywords which is a closest match out of the plurality of pre-stored keywords to the misspelled keyword; cause, contemporaneously with the virtual chat communication session when at least a predetermined number of letters in the misspelled keyword match the predetermined number of letters in the candidate keyword, implementation of the command with the misspelled keyword replaced by the candidate keyword.

In accordance with the apparatus, the set of instructions, which when executed by the one or more processors, enables the predetermined number of letters to be a predetermined percentage of a number of letters in the misspelled keyword.

In accordance with the apparatus, the set of instructions, which when executed by the one or more processors, causes the predetermined percentage to be at least 80%.

In accordance with the apparatus, the set of instructions, which when executed by the one or more processors, causes a display of the candidate keyword on the chat interface.

In accordance with the apparatus, the set of instructions, which when executed by the one or more processors, enables the user to enter a configuration command in the chat interface to set the predetermined number of letters.

In accordance with the apparatus, the set of instructions, which when executed by the one or more processors, causes the apparatus to set the predetermined number of letters.

In accordance with the apparatus, the set of instructions, which when executed by the one or more processors, causes the apparatus to set the predetermined number of letters as a default setting for further virtual chat communication sessions.

In accordance with one or more embodiments set forth, illustrated and described herein, a computer program product comprising at least one non-transitory computer readable medium having with a set of instructions of computer-executable program code, which when executed by one or more processors of a computing device, causes the computing device to, receive, from a client device of a user during a virtual chat communication session between a virtual support agent of a financial institution on a chat interface visually displayed on a user interface of the client device of a user executing a mobile application or desktop application associated with the financial institution over a communication network, a command; detect, contemporaneously with the virtual chat communication session, a misspelled keyword in the command; determine, contemporaneously with the virtual chat communication session in response to the detection, a candidate keyword out of a plurality of pre-stored keywords which is a closest match out of the plurality of pre-stored keywords to the misspelled keyword; cause, contemporaneously with the virtual chat communication session when at least a predetermined number of letters in the misspelled keyword match the predetermined number of letters in the candidate keyword, implementation of the command with the misspelled keyword replaced by the candidate keyword.

In accordance with the computer program product, the set of instructions, which when executed by the one or more processors, enables the predetermined number of letters to be a predetermined percentage of a number of letters in the misspelled keyword.

In accordance with the computer program product, the set of instructions, which when executed by the one or more processors, causes the predetermined percentage to be at least 80%.

In accordance with the computer program product, the set of instructions, which when executed by the one or more processors, causes a display of the candidate keyword on the chat interface.

In accordance with the computer program product, the set of instructions, which when executed by the one or more processors, enables the user to enter a configuration command in the chat interface to set the predetermined number of letters.

In accordance with the computer program product, the set of instructions, which when executed by the one or more processors, causes the computing device to set the predetermined number of letters.

In accordance with the computer program product, the set of instructions, which when executed by the one or more processors, causes the computing device to set the predetermined number of letters as a default setting for further virtual chat communication sessions.

In accordance with one or more embodiments illustrated, set forth, and described herein, a computer implemented method may comprise one or more of the following: receiving, by one or more financial institution servers associated with a financial institution during a virtual chat communication session between a virtual support agent of a financial institution on a chat interface visually displayed on a user interface of a client device of a user executing a mobile application or desktop application associated with the financial institution over a communication network, a command from the client device; detecting, by the one or more financial institution servers contemporaneously with the virtual chat communication session, a misspelled keyword in the command; determining, by the one or more financial institution servers in response to the detection, a candidate keyword out of a plurality of pre-stored keywords which is a closest match out of the plurality of pre-stored keywords to the misspelled keyword; and causing, by the one or more financial institution servers contemporaneously with the virtual chat communication session when at least a predetermined number of letters in the misspelled keyword match the predetermined number of letters in the candidate keyword, implementation of the command with the misspelled keyword replaced by the candidate keyword.

In accordance with each respective computer implemented method, further comprising, by the one or more financial institution servers, enabling the predetermined number of letters to be a predetermined percentage of a number of letters in the misspelled keyword.

In accordance with each respective computer implemented method, further comprising, causing the predetermined percentage to be at least 80%.

In accordance with each respective computer implemented method, further comprising, by the one or more financial institution servers, causing a display of the candidate keyword on the chat interface.

In accordance with each respective computer implemented method, further comprising, by the one or more financial institution servers, enabling the user to enter a configuration command in the chat interface to set the predetermined number of letters.

In accordance with each respective computer implemented method, further comprising, by the one or more financial institution servers, setting the predetermined number of letters as a default setting for further virtual chat communication sessions.

DRAWINGS

The various advantages of the exemplary embodiments will become apparent to one skilled in the art by reading the following specification and appended claims, and by referencing the following drawings, in which:

FIG. 7 illustrates a virtual chat communication session between a user and a virtual support agent, in accordance with one or more embodiments set forth and described herein.

DESCRIPTION

Figure 1:
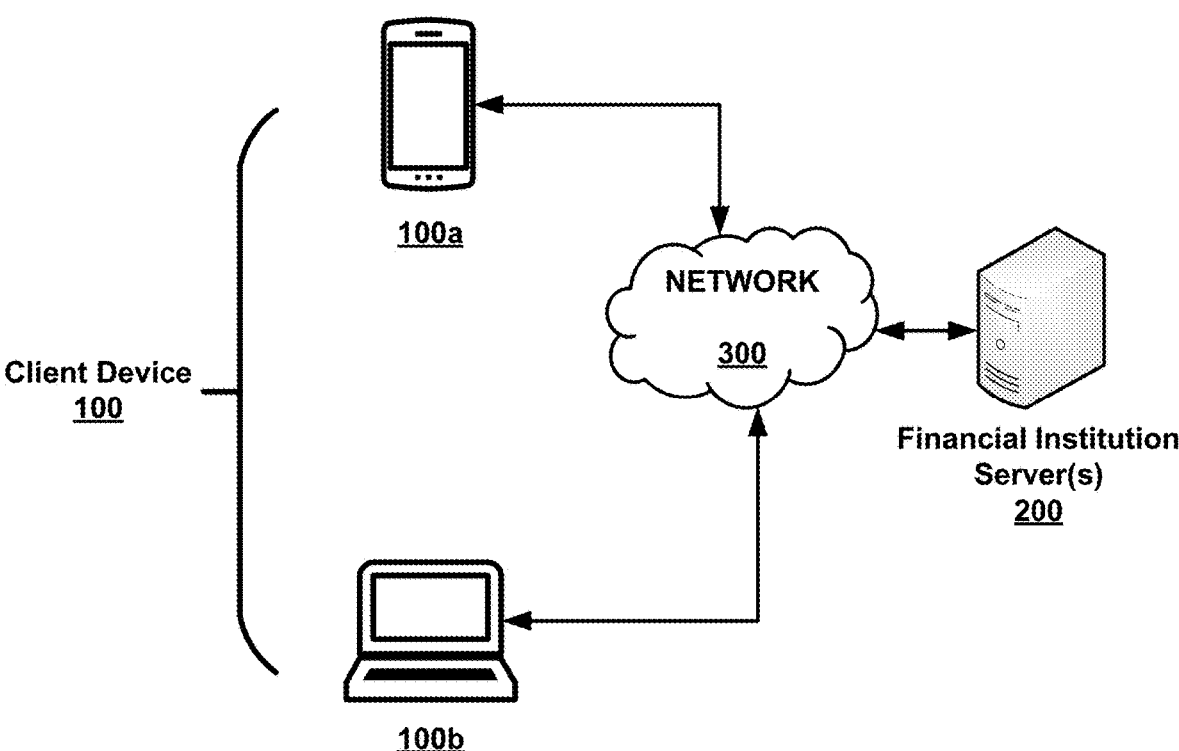
FIG. 1 illustrates a communication environment, in accordance with one or more embodiments set forth and described herein.

Hereinbelow are example definitions that are provided only for illustrative purposes in this disclosure, and should not be construed to limit the scope of the one or more embodiments disclosed herein in any manner. Some terms are defined below for purposes of clarity. These terms are not rigidly restricted to these definitions. This disclosure contemplates that these terms and other terms may also be defined by their use in the context of this description.

As used herein, "application" relates to software used on a computer (usually by a client and/or client device and can be applications that are targeted or supported by specific classes of machine, such as a mobile application, desktop application, tablet application, and/or enterprise application (e.g., client device application(s) on a client device). Applications may be separated into applications which reside on a client device (e.g., VPN, PowerPoint, Excel) and cloud applications which may reside in the cloud (e.g., Gmail, GitHub). Cloud applications may correspond to applications on the client device or may be other types such as social media applications (e.g., Facebook).

As used herein, "artificial intelligence (AI)" relates to one or more computer system operable to perform one or more tasks that normally require human intelligence, such as visual perception, speech recognition, decision-making, and translation between languages.

As used herein, "machine learning" relates to an application of AI that provides computer systems the ability to automatically learn and improve from data and experience without being explicitly programmed.

As used herein, "computer" relates to a single computer or to a system of interacting computers. A computer is a combination of a hardware system, a software operating system and perhaps one or more software application programs. Examples of a computer include without limitation a personal computer (PC), laptop computer, a smart phone, a cell phone, or a wireless tablet.

As used herein, "client device" relates to any device associated with a user, including personal computers, laptops, tablets, and/or mobile smartphones.

As used herein, "modules" relates to either software modules (e.g., code embodied on a machine-readable medium or in a transmission signal) or hardware modules. Certain embodiments are described herein as including logic or a number of components, modules, or mechanisms. A "hardware module" (or just "hardware") as used herein is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein. In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as an FPGA or an ASIC. A hardware module may also include programmable logic or circuitry that is temporarily configured by software to perform certain operations. A hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations. Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time. Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access.

As used herein, "network" or "networks" relates to any combination of electronic communication networks, including without limitation the Internet, a local area network (LAN), a wide area network, a wireless network, and a cellular network (e.g., 4G, 5G).

As used herein, "processes" or "methods" are presented in terms of processes (or methods) or symbolic representations of operations on data stored as bits or binary digital signals within a machine memory (e.g., a computer memory). These processes or symbolic representations are examples of techniques used by those of ordinary skill in the data processing arts to convey the substance of their work to others skilled in the art. As used herein, a "process" is a self-consistent sequence of operations or similar processing leading to a desired result. In this context, processes and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information.

As used herein, "processor-Implemented module" relates to a hardware module implemented using one or more processors. The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein.

As used herein, "server" relates to a server computer or group of computers that acts to provide a service for a certain function or access to a network resource. A server may be a physical server, a hosted server in a virtual environment, or software code executing on a platform.

As used herein, "service" or "application" relates to an online server (or set of servers), and can refer to a web site and/or web application.

As used herein, "software" relates to a set of instructions and associated documentations that tells a computer what to do or how to perform a task. Software includes all different software programs on a computer, such as applications and the operating system. A software application could be written in substantially any suitable programming language, which could easily be selected by one of ordinary skill in the art. The programming language chosen should be compatible with the computer by which the software application is to be executed and, in particular, with the operating system of that computer. Examples of suitable programming languages include without limitation Object Pascal, C, C++, CGI, Java, and Java Scripts. Further, the functions of some embodiments, when described as a series of steps for a method, could be implemented as a series of software instructions for being operated by a processor, such that the embodiments could be implemented as software, hardware, or a combination thereof.

As used herein, "sensor" relates to any device, component and/or system that can perform one or more of detecting, determining, assessing, monitoring, measuring, quantifying, and sensing something.

As used herein, "real-time" relates to a level of processing responsiveness that a user, module, or system senses as sufficiently immediate for a particular process or determination to be made, or that enables the processor to keep up with some external process.

As used herein, "user" relates to a consumer, machine entity, and/or requesting party, and may be human or machine.

In accordance with one or more embodiments set forth, illustrated, and described herein, a virtual chat communication platform is provided for a client device of a user having one or more financial accounts residing at one or more financial institution servers of a financial institution. The virtual chat communication platform enables a single user, using a single client device, to participate in multiple simultaneous virtual chat communication sessions with virtual support agents acting on behalf of the financial institution in support of serving the needs of the user. In that way, the user is not forced to cancel or end a first virtual chat communication session in order to commence two or more additional virtual chat communication sessions using the same client device.

Turning to the figures, in which FIG. 1 illustrates a communication environment that facilitates communications between a user and a financial institution. A client device 100 of a user (financial account holder) operating in the communication environment facilitates user access to and user management of one or more financial accounts residing at one or more financial institution servers 200 of the financial institution. The communication environment includes the client device 100, the one or more financial institution servers 200, and a communication network 300 through which communication is facilitated between the client device 100 and the one or more financial institution servers 200.

In accordance with one or more embodiments set forth, described, and/or illustrated herein, the client device 100 comprises a computing device, including but not limited to a desktop computer, a laptop computer, a smart phone, a handheld personal computer, a workstation, a game console, a cellular phone, a mobile device, a personal computing device, a wearable electronic device, a smartwatch, smart eyewear, a tablet computer, a convertible tablet computer, or any other electronic, microelectronic, or micro-electromechanical device for processing and communicating data. This disclosure contemplates the client device 100 comprising any form of electronic device that optimizes or otherwise transforms the performance and functionality of the one or more embodiments in a manner that falls within the spirit and scope of the principles of this disclosure.

Figure 2:
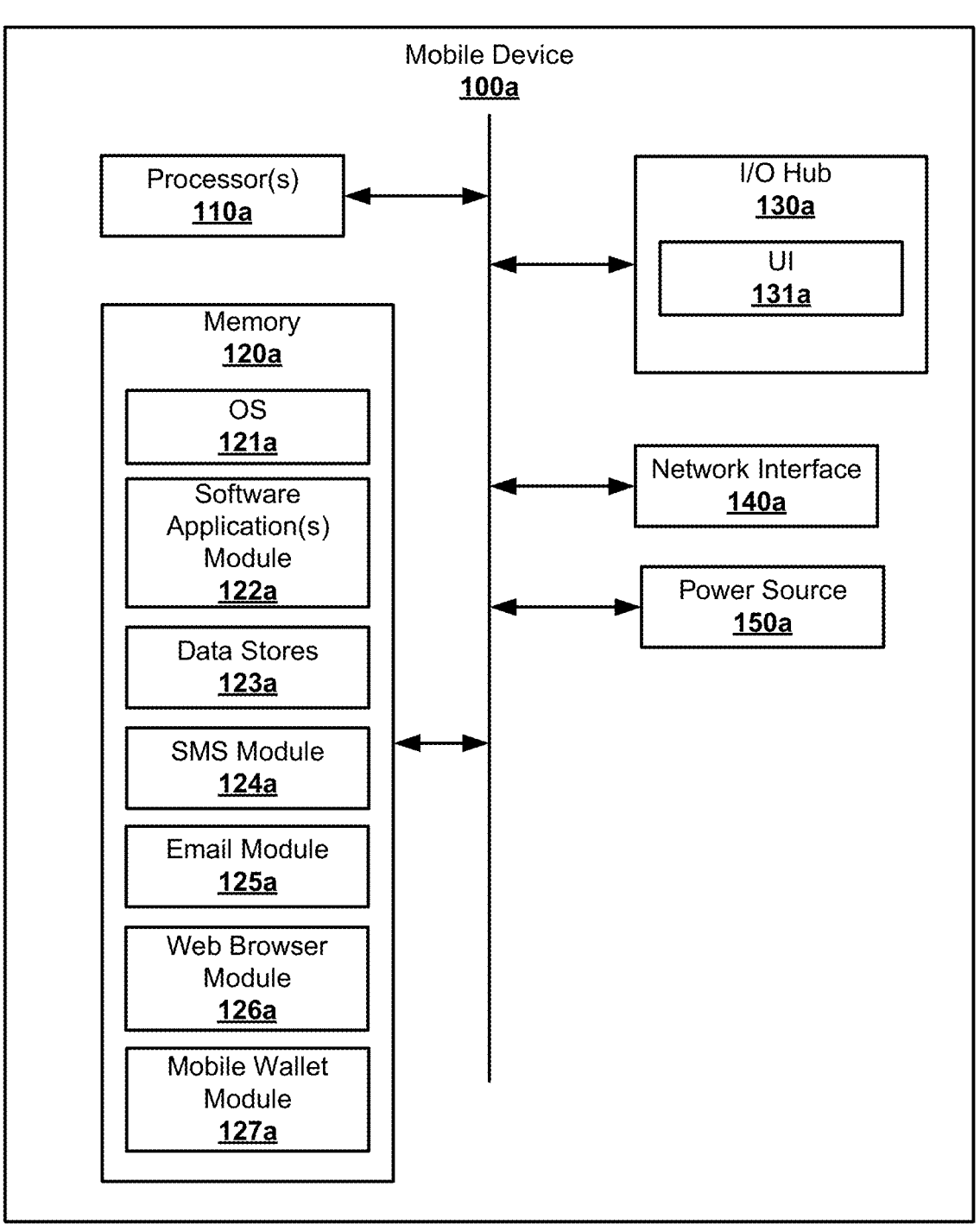
FIG. 2 illustrates a block diagram of the first client device of FIG. 1.

In the illustrated example embodiment of FIG. 2, the client device 100 comprises a mobile device 100a. Some of the possible operational elements of the mobile device 100a are illustrated in FIG. 2 and will now be described herein. It will be understood that it is not necessary for the mobile device 100a to have all the elements illustrated in FIG. 2. For example, the mobile device 100a may have any combination of the various elements illustrated in FIG. 2. Moreover, the mobile device 100a may have additional elements to those illustrated in FIG. 2.

The mobile device 100a includes one or more processors 110a, a non-transitory memory 120a operatively coupled to the one or more processors 110a, an I/O hub 130a, a network interface 140a, and a power source 150a.

The memory 120a comprises a set of instructions of computer-executable program code. The set of instructions are executable by the one or more processors 110a to cause execution of an operating system 121a and one or more software applications of a software application module 122a that reside in the memory 120a. The one or more software applications residing in the memory 120a includes, but is not limited to, a financial institution application that is associated with the financial institution. The financial institution application comprises a mobile application or desktop application that facilitates establishment of a secure connection between the mobile device 100a and the one or more financial institution servers 200. The one or more processors 110a are operable to execute the mobile application or desktop application to facilitate user access to the one or more financial accounts and user management of the one or more financial accounts.

The memory 120a also includes one or more data stores 123a that are operable to store one or more types of data. The mobile device 100a may include one or more interfaces that facilitate one or more systems or modules thereof to transform, manage, retrieve, modify, add, or delete, the data residing in the data stores 123a. The one or more data stores 123a may comprise volatile and/or non-volatile memory. Examples of suitable data stores 123a include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 123a may be a component of the one or more processors 110a or alternatively, may be operatively connected to the one or more processors 110a for use thereby. As set forth, described, and/or illustrated herein, "operatively connected" may include direct or indirect connections, including connections without direct physical contact.

The memory 120a also includes an SMS module 124a operable to facilitate user transmission and receipt of text messages via the mobile device 100a though the network 300. In one example embodiment, the user may receive text messages from the financial institution that are associated with the user access and the user management of the one or more financial accounts. An email module 125a is operable to facilitate user transmission and receipt of email messages via the mobile device 100a through the network 300. In one example embodiment, the user may receive email messages from the financial institution that are associated with the user access and the user management of the one or more financial accounts. The user may utilize a web browser module 126a that is operable to facilitate user access to one or more websites associated with the financial institution through the network 300. A digital wallet module 127a facilitates the generation of one or more digital wallets associated with the one or more financial accounts.

In accordance with one or more embodiments set forth, described, and/or illustrated herein, the mobile device 100a includes an I/O hub 130a operatively connected to other systems and subsystems of the mobile device 100a. The I/O system 130a may include one or more of an input interface, an output interface, and a network controller to facilitate communications between the mobile device 100*a* and the one or more financial institution servers 200. The input interface and the output interface may be integrated as a single, unitary user interface 131*a*, or alternatively, be separate as independent interfaces that are operatively connected.

As used herein, the input interface is defined as any device, software, component, system, element, or arrangement or groups thereof that enable information and/or data to be entered as input commands by a user in a manner that directs the one or more processors 110*a* to execute instructions. The input interface may comprise a user interface (UI), a graphical user interface (GUI), such as, for example, a display, human-machine interface (HMI), or the like. Embodiments, however, are not limited thereto, and thus, this disclosure contemplates the input interface comprising a keypad, touch screen, multi-touch screen, button, joystick, mouse, trackball, microphone and/or combinations thereof.

As used herein, the output interface is defined as any device, software, component, system, element or arrangement or groups thereof that enable information/data to be presented to a user. The output interface may comprise one or more of a visual display or an audio display, including, but not limited to, a microphone, earphone, and/or speaker. One or more components of the mobile device 100*a* may serve as both a component of the input interface and a component of the output interface.

The mobile device 100*a* also includes a network interface 140*a* operable to facilitate connection to the network 300. The mobile device 100*a* further includes a power source 150*a* that comprises a wired powered source, a wireless power source, a replaceable battery source, or a rechargeable battery source.

Figure 3:
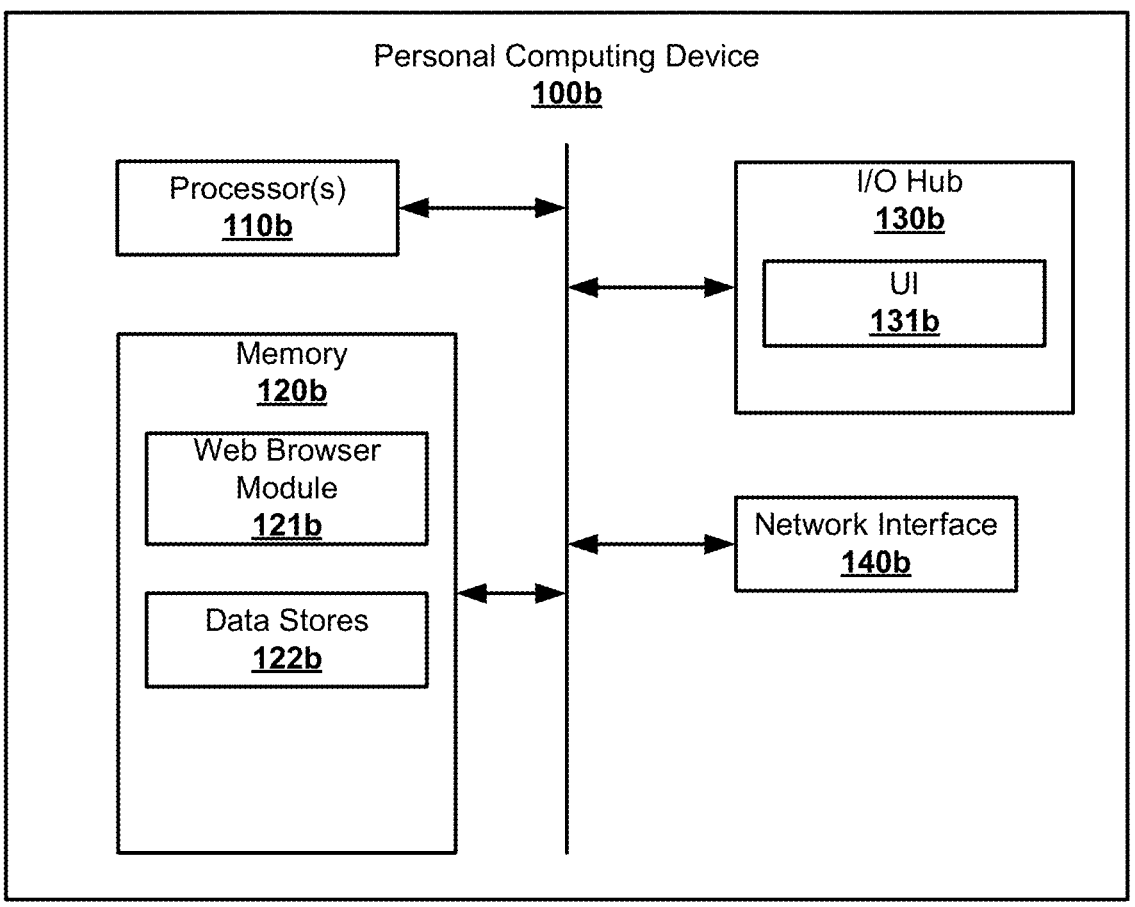
FIG. 3 illustrates a block diagram of the second client device of FIG. 1.

In the illustrated example embodiment of FIG. 3, the client device 100 comprises a personal computing device 100*b*. Some of the possible operational elements of the personal computing device 100*b* are illustrated in FIG. 3 and will now be described herein. It will be understood that it is not necessary for the personal computing device 100*b* to have all the elements illustrated in FIG. 3. For example, the personal computing device 100*b* may have any combination of the various elements illustrated in FIG. 3. Moreover, the personal computing device 100*b* may have additional elements to those illustrated in FIG. 3.

The personal computing device 100*b* includes one or more processors 110*b*, a non-transitory memory 120*b* operatively coupled to the one or more processors 110A, an I/O hub 130*b*, and a network interface 140*b*.

The memory 120*b* comprises a set of instructions of computer-executable program code. The set of instructions are executable by the one or more processors 110*b* to cause control of the web browser module 121*b* in a manner that facilitates user access to a web browser having one or more websites associated with the financial institution through the network 300.

The memory 120*b* also includes one or more data stores 122*b* that are operable to store one or more types of data. The personal computing device 100*b* may include one or more interfaces that facilitate one or more systems or modules thereof to transform, manage, retrieve, modify, add, or delete, the data residing in the data stores 122*b*. The one or more data stores 122*b* may comprise volatile and/or non-volatile memory. Examples of suitable data stores 122*b* include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 122*b* may be a component of the one or more processors 110*b*, or alternatively, may be operatively connected to the one or more processors 110*b* for use thereby. As set forth, described, and/or illustrated herein, "operatively connected" may include direct or indirect connections, including connections without direct physical contact.

In accordance with one or more embodiments set forth, described, and/or illustrated herein, "processor" means any component or group of components that are operable to execute any of the processes described herein or any form of instructions to carry out such processes or cause such processes to be performed. The one or more processors 100*b* may be implemented with one or more general-purpose and/or one or more special-purpose processors. Examples of suitable processors include graphics processors, microprocessors, microcontrollers, DSP processors, and other circuitry that may execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The one or more processors 110*b* may comprise at least one hardware circuit (e.g., an integrated circuit) operable to carry out instructions contained in program code. In embodiments in which there is a plurality of processors, such processors may work independently from each other, or one or more processors may work in combination with each other.

In accordance with one or more embodiments set forth, described, and/or illustrated herein, the personal computing device 100*a* includes an I/O hub 130*b* operatively connected to other systems and subsystems of the personal computing device 100*a*. The I/O system 130*b* may include one or more of an input interface, an output interface, and a network controller to facilitate communications between the personal computing device 100*a* and the one or more financial institution servers 200. The input interface and the output interface may be integrated as a single, unitary user interface 131*b*, or alternatively, be separate as independent interfaces that are operatively connected.

As used herein, the input interface is defined as any device, software, component, system, element, or arrangement or groups thereof that enable information and/or data to be entered as input commands by a user in a manner that directs the one or more processors 110*b* to execute instructions. The input interface may comprise a user interface (UI), a graphical user interface (GUI), such as, for example, a display, human-machine interface (HMI), or the like. Embodiments, however, are not limited thereto, and thus, this disclosure contemplates the input interface comprising a keypad, touch screen, multi-touch screen, button, joystick, mouse, trackball, microphone and/or combinations thereof.

As used herein, the output interface is defined as any device, software, component, system, element or arrangement or groups thereof that enable information/data to be presented to a user. The output interface may comprise one or more of a visual display or an audio display, including, but not limited to, a microphone, earphone, and/or speaker. One or more components of the mobile device 100*a* may serve as both a component of the input interface and a component of the output interface.

The personal computing device 100*b* also includes a network interface 140*b* operable to facilitate connection to the network 300.

Figure 4:
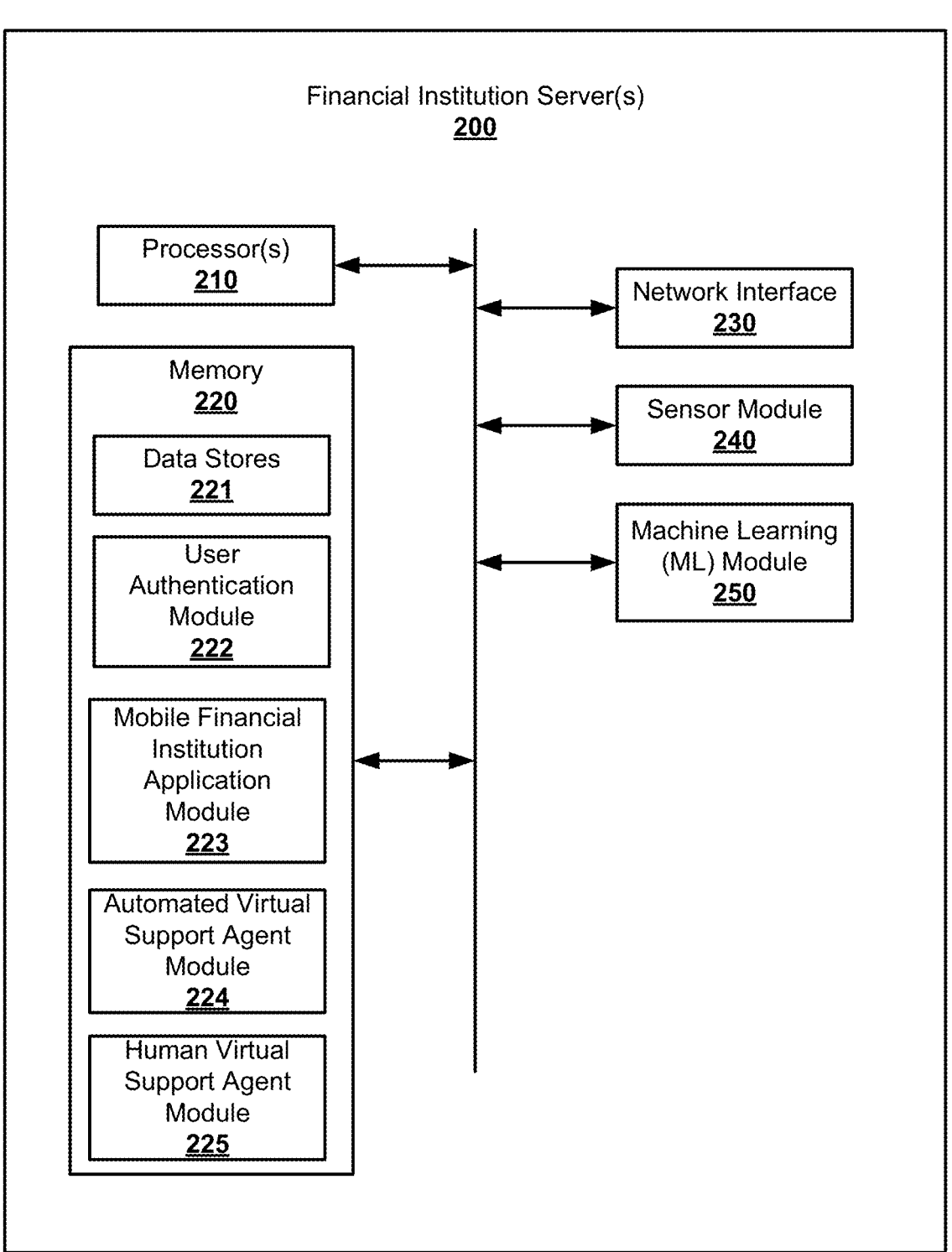
FIG. 4 illustrates a block diagram of the one or more financial institution servers of FIG. 1.

As illustrated in FIG. 4, the one or more financial institution servers 200 includes one or more processors 210, a non-transitory memory 220 operatively coupled to the one or more processors 210, a network interface 230, a sensor module 240, and a machine learning (ML) module 250. Some of the possible operational elements of each server in the one or more financial institution servers 200 are illustrated in FIG. 4 and will now be described herein. It will be understood that it is not necessary for each server in the one or more financial institution servers 200 to have all the elements illustrated in FIG. 4. For example, each server in the one or more financial institution servers 200 may have any combination of the various elements illustrated in FIG. 4. Moreover, each server in the one or more financial institution servers 200 may have additional elements to those illustrated in FIG. 4.

The one or more financial institution servers 200 may be controlled by a system manager (or policy manager) of the financial institution.

In accordance with one or more embodiments set forth, described, and/or illustrated herein, the one or more financial institution servers 200 may comprise a computing device, including but not limited to a server computer, a desktop computer, a laptop computer, a smart phone, a handheld personal computer, a workstation, a game console, a cellular phone, a mobile device, a personal computing device, a wearable electronic device, a smartwatch, smart eyewear, a tablet computer, a convertible tablet computer, or any other electronic, microelectronic, or micro-electromechanical device for processing and communicating data. This disclosure contemplates the one or more financial institution servers 200 comprising any form of electronic device that optimizes or otherwise transforms the performance and functionality of the one or more embodiments in a manner that falls within the spirit and scope of the principles of this disclosure.

The memory 220 comprises a set of instructions of computer-executable program code. The set of instructions are executable by the one or more processors 210 in manner that facilitates control of a user authentication module 222, a mobile financial institution application module 223 having one or more mobile financial institution applications that reside in the memory 220, an automated virtual support agent module 224, and a human virtual support agent module 225. In accordance with one or more embodiments set forth, described, and/or illustrated herein, the one or more financial institution servers 200 may individually or collectively execute the instructions to perform any one or more of the methodologies set forth, described, and illustrated herein.

The memory 220 also includes one or more data stores 221 that are operable to store one or more types of data, including but not limited to, user account data, user authentication data, sensor data, etc. The one or more data stores 221 may comprise volatile and/or non-volatile memory. Examples of suitable data stores 221 include, but are not limited to RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable non-transitory storage medium, or any combination thereof. The one or more data stores 221 may be a component of the one or more processors 210, or alternatively, may be operatively connected to the one or more processors 210 for use thereby. As set forth, described, and/or illustrated herein, "operatively connected" may include direct or indirect connections, including connections without direct physical contact.

The memory 220 may include a single machine-readable medium, or a plurality of media (e.g., a centralized or distributed database, or associated caches and servers) operable to store the instructions. The term "machine-readable medium" shall also be taken to include any medium, or combination of multiple media, that is capable of storing instructions (e.g., software) for execution by a server (e.g., server), such that the instructions, when executed by the one or more processors 210, cause the one or more financial institution servers 200 to perform any one or more of the methodologies set forth, described, and illustrated herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. The memory 220 can store computer readable program code and data which, when executed by the one or more processors 210 (or other processors) can implement (or cause to be implemented) any of the features and methodologies described herein.

The computer-executable program code may instruct the one or more processors 210 to cause the user authentication module 221 to authenticate a user in order to gain user access to the one or more financial accounts. The user authentication module 221 may be caused to request user input user data or user identification that include, but are not limited to, user identity (e.g., username), a user passcode, a cookie, user biometric data, a private key, a token, and/or another suitable authentication data or information.

The computer-executable program code may instruct the one or more processors 210 to execute certain logic, data-processing, and data-storing functions of the one or more financial institution servers 200, in addition to certain communication functions of the one or more financial institution servers 200. The one or more mobile financial institution applications of the mobile financial institution application module 222 are operable to communicate with the first client device 100*a* and the second client device 100*b* in a manner which facilitates user access to the one or more financial accounts in addition to user management of the one or more financial accounts based on successful user authentication.

The sensor module 240 is operable, at least during execution of the mobile application or desktop application by the client device 100, to dynamically detect, determine, assess, monitor, measure, quantify, and/or sense information about the client device 100. The sensor module 240 may be operable to detect, determine, assess, monitor, measure, quantify and/or sense in real-time. The sensor module 240 may be operable to detect, determine, assess, monitor, measure, quantify, and/or sense geographic location information about the geographic location of the client device 100.

The ML module 250 may include one or more ML algorithms to train one or more machine learning models of the one or more financial institution servers 200 based on data and/or information resided in the memory 220. The ML algorithms may include one or more of a linear regression algorithm, a logical regression algorithm, or a combination of different algorithms. A neural network may also be used to train the system based on the received data. The ML module 250 may analyze the received data and/or information, and transform the data and/or information in a manner which provides enhanced communication between the client device 100 and the one or more financial institution servers 200, while also enhancing user access and management of the one or more financial accounts. The data and/or information may also be up-linked to other systems and modules in the one or more financial institution servers 200 for further processing to discover additional information that may be used to enhance the understanding of the information.

In accordance with one or more embodiments set forth, described, and/or illustrated herein, the network 300 may comprise a wireless network, a wired network, or any suitable combination thereof. For example, the network 300 is operable to support connectivity using any protocol or technology, including, but not limited to wireless cellular, wireless broadband, wireless local area network (WLAN), wireless personal area network (WPAN), wireless short distance communication, Global System for Mobile Communication (GSM), or any other suitable wired or wireless network operable to transmit and receive a data signal.

In accordance with one or more embodiments set forth, described, and/or illustrated herein, a user may, via the client device 100, execute a mobile application or desktop application associated with the financial institution over the communication network 300.

Figure 5:
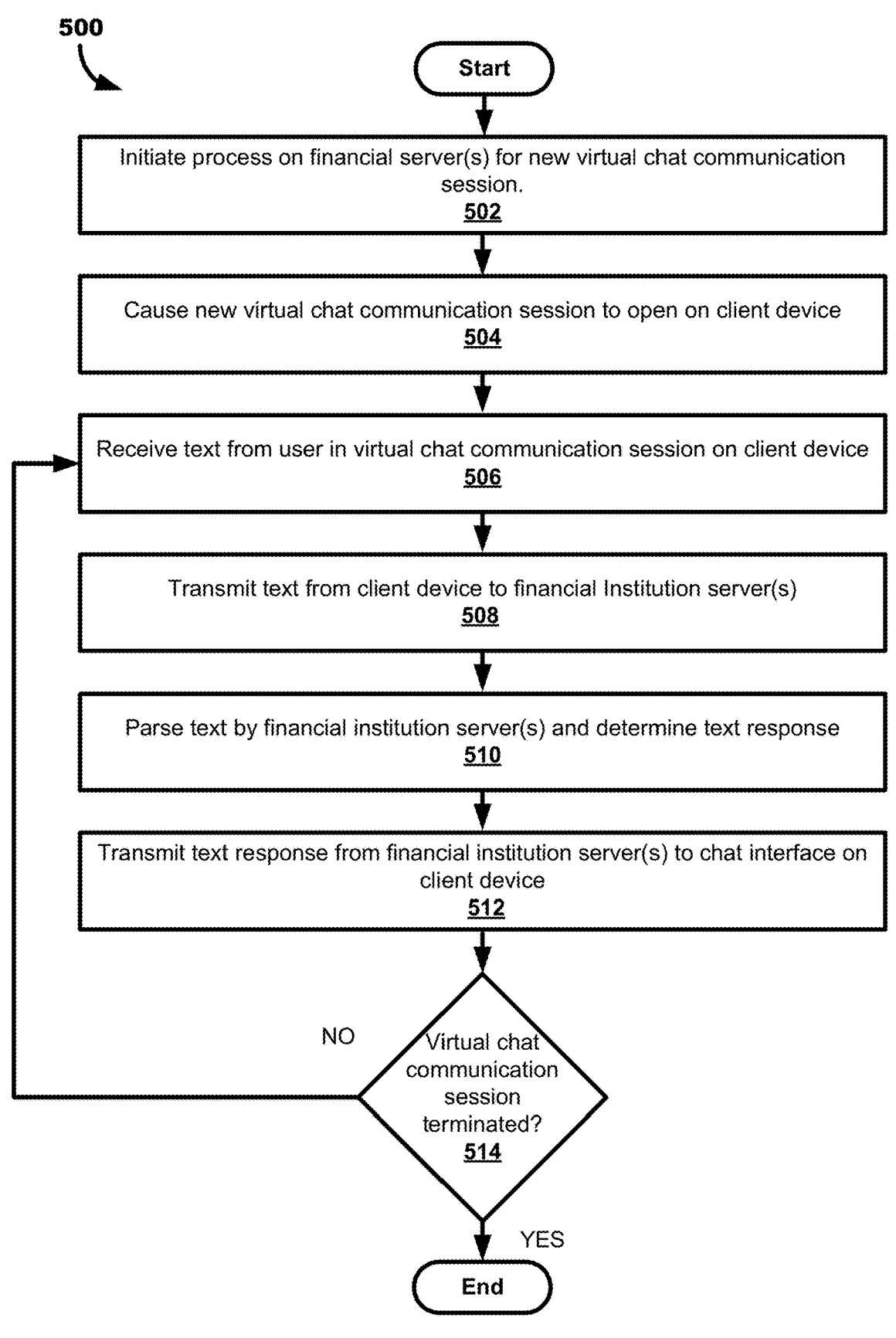
FIG. 5 illustrates a computer-implemented method for implementing a chat communication session with a virtual support agent, in accordance with one or more embodiments set forth and described herein.
Figure 6:
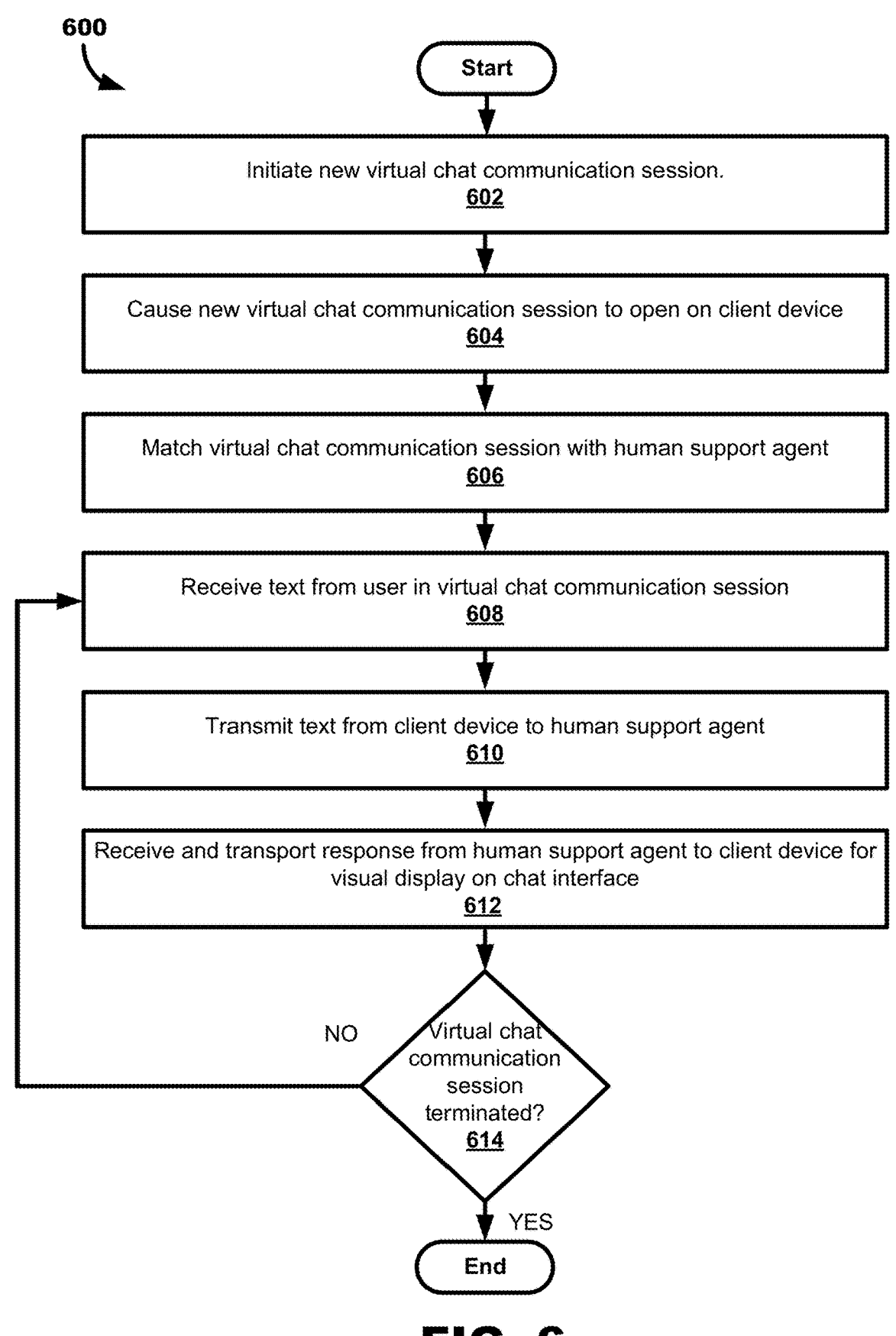
FIG. 6 illustrates a computer-implemented method for implementing a chat communication session with a human virtual support agent, in accordance with one or more embodiments set forth and described herein.

Illustrated examples shown in FIGS. 5 and 6 set forth computer-implemented methods 500 and 600. In one or more examples, the respective flowcharts of the computer-implemented methods 500 and 60 may be implemented by the one or more processors 210 of the one or more financial institution servers 200. In particular, the computer-implemented methods 500 and 600 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

In accordance with one or more embodiments set forth, described, and/or illustrated herein, software executed by the one or more financial institution servers 200 provides functionality described or illustrated herein. In particular, software executed by the one or more processors 210 is operable to perform one or more processing blocks of the computer-implemented methods 500 and 600 set forth, described, and/or illustrated herein, or provides functionality set forth, described, and/or illustrated.

As illustrated in FIG. 5, a computer-implemented method 500 can implement a virtual chat communication session between a user and an automated virtual support agent, in accordance with one or more embodiments set forth and described herein. Illustrated process block 502 causes the one or more processors 210 to initiate a new dedicated process in order to facilitate a new virtual chat communication session. This initiation may include such operations as allocating memory, adding the new virtual chat communication session to a chat queue (of all virtual chat communication sessions administered by the financial institution server(s) 200), and all other such tasks.

From illustrated process block 502, the computer-implemented method 500 proceeds to illustrated process block 504, which causes a visual display of a new virtual chat communication session on the client device 100 by causing software executing on the client device 100 to display a GUI showing the new virtual chat communication session. A virtual chat communication session can be a stand-alone chat interface comprising a chat window, or a chat window superimposed over a chat widget (discussed further herein) or any GUI which functions to facilitate a virtual chat communication session between a user and a virtual support agent. The one or more processors 210 would communicate with a process executing on the client device 100 so that the process (could be an application program executing on the client device, a web browser, the operating system on the client device 100 itself, etc.) instructs the client device 100 to open the new virtual chat communication session by utilizing a GUI on the interface 131a, 131b of the client device 100.

From illustrated process block 504, the computer-implemented method 500 proceeds to illustrated process block 506, which includes receiving text entered (textual, verbal, etc.) by the user into the GUI on the client device 100.

From illustrated process block 506, the computer-implemented method 500 proceeds to illustrated process block 508, which includes analyzing/processing the text of the user by parsing, e.g., by separating the words contained in the text and analyzing the text using one or more such techniques, such as a rules-based system, a machine learning model (such as a convolution neural network), natural language processing (NLP), text mining, or the like.

From illustrated process block 508, the computer-implemented method 500 proceeds to illustrated process block 510, which includes generating (or determining) a response to the text in response to analyzing/processing the text. The response may be generated using the one or more such techniques, which may include querying a database/storage location in memory 220 to retrieve the response. For example, should the user provide a text query "what is my account balance," the text analyzer would analyze the text to determine that there is an unknown quantity needed (the user's account balance), and then query the one or more financial institution server(s) 200 to retrieve the quantity needed (the user's account balance).

From illustrated process block 510, the computer-implemented method 500 proceeds to illustrated process block 512, which includes, after generating the response, transmitting the response, and causing a visual display thereof (e.g., "Your balance is $1,000.00") on the chat interface on the user interface 131a, 131b.

From illustrated process block 512, the computer-implemented method 500 proceeds to illustrated decision block 514, which determines whether any event(s) has/have occurred to terminate the virtual chat communication session. A number of events may result in termination of the virtual chat communication session, including, but not limited to, the user closing the chat window on the client device 100, the user communicating (textually and/or verbally) "end this chat" (or some similar phrase), a human virtual support agent manually terminating the virtual chat communication session, the lapse of a predetermined amount of time (e.g., 10 minutes) without receiving any input from the user on the client device 100, the user logging out of the mobile application or desktop application on the client device 100, etc. Note that should no event occur to terminate the virtual chat communication session, then the virtual chat communication session will continue. Should, in illustrated decision block 514, it be determined that the virtual chat communication session is terminated, then the computer-executable program code may instruct the one or more processors 210 to close the virtual chat communication session processes, and the virtual chat communication session would no longer require resources by the financial institution server(s) 200. Should, in illustrated decision block 514, it be determined that the virtual chat communication session has not been terminated, then the computer-implemented method 500 would return to illustrated process block 506.

In accordance with one or more embodiments described herein, a user can engage in multiple virtual chat communication sessions in parallel (i.e., contemporaneously or simultaneously) with different virtual support agents (human or automated) from a financial institution. This can be advantageous because the user may have separate issues to discuss, and while the user is waiting for a response from one virtual support agent, may engage in another virtual chat communication session another virtual support agent to discuss another issue. Executing multiple virtual chat communication sessions in parallel can also be advantageous in that the user can separate different issues into different respective virtual chat communication sessions, avoiding potential confusion of using a single virtual chat communication session to address different issues. Using multiple virtual chat communication sessions can also be advantageous because a user may have one complex issue which requires a human virtual support agent while also having a simple issue which could be addressed by a virtual agent, so utilizing separate virtual chat communication sessions for each (one session with a human virtual support agent and one session with a virtual agent) would preserve resources at the financial institution.

As illustrated in FIG. 6, a computer-implemented method 600 can implement a virtual chat communication session between a user and a human virtual support agent, in accordance with one or more embodiments set forth and described herein. Illustrated process blocks 602 and 604 can be implemented the same as illustrated process blocks 502 and 504, respectively, from FIG. 5.

From illustrated process block 604, the computer-implemented method 600 proceeds to illustrated process block 606, which includes matching the virtual chat communication session for the user with a human virtual support agent associated with the financial institution. The financial institution may have one or more human virtual support agents having access to the financial institution server(s) 200, and whom have their own client device to facilitate communication with the user via a virtual chat communication session. The computer-executable program code may instruct the one or more processors 210 to match the virtual chat communication session with one of the plurality of human virtual support agents. The matching can be executed randomly, or a human virtual support agent can be selected based on certain criteria (e.g., linguistically compatible with a detected language used by the user, specialized knowledge and/or experience in the financial service being requested by the user, etc.)

From illustrated process block 606, the computer-implemented method 600 proceeds to illustrated process block 608, which includes receiving text entered (textual, verbal, etc.) by the user into the GUI on the client device 100.

From illustrated process block 608, the computer-implemented method 600 proceeds to illustrated process block

610, which includes transmitting the text received from the virtual chat communication session (in illustrated process block 608) to the matched human virtual support agent for this respective virtual chat communication session.

From illustrated process block 610, the computer-implemented method 600 proceeds to illustrated process block 612, which includes receiving and transmitting a response (textually or verbally) from the human virtual support agent (the human virtual support agent could first conduct research of data/information stored in memory 220), and then routing the response to the client device 100 for visual display on the user interface 131*a*, 131*b*.

From illustrated process block 612, the computer-implemented method 600 proceeds to illustrated decision block 614, which determines whether any event(s) has/have occurred to terminate the virtual chat communication session. This can be done identically to illustrated decision block 614 from FIG. 5. Should it be determined that the virtual chat communication session is terminated, then the chat window visually displayed on the user interface 131*a*, 131*b* of the client device 100 is closed (for this particular virtual chat communication session only, any remaining virtual chat communication session would still be active and visually displayed). Should it be determined that the virtual chat communication session is not terminated, the computer-implemented method 600 would return to illustrated process block 608.

As illustrated in FIG. 7, upon a user launching a financial institution mobile application or desktop application on the client device 100, and being authenticated by the user authentication module 221, the computer-executable program code may instruct the one or more processors 210 to cause a display of a GUI on the user interface 131*a*, 131*b* of the client device 100. The GUI comprises a chat interface (e.g., a chat window) 700 that facilitates a virtual chat communication session (e.g., a textual chat or a verbal chat) with a virtual support agent that comprises a plurality of chat messages 703, 704 and 705. A chat box 701 is used for the user to enter chat messages (e.g., queries, commands, etc.) intended for the virtual support agent and also displayed as a chat message above the chat box 701. For example, during the virtual chat communication session, the user may transmit a chat message 704 comprising a general request (verbal or textual) for information. In response to the request/command, the computer-executable program code may instruct the one or more processors 210 to execute analysis or processing (e.g., parsing and/or NLP) of the request/command (chat message 704). This will be executed for all chat messages transmitted by the user via the client device 100. In response to executing or implementing the NLP, the computer-executable program code may instruct the one or more processors 210 to generate a response to the message 704, and then transmit a chat message 705 providing information that was requested by the user. In particular, in response to receipt of the user message 704 for information, the computer-executable program code may instruct the one or more processors 210 to cause a visual display of a chat message 705 on the chat interface visually displayed on the user interface 131*a*, 131*b* of the client device 100.

In accordance with one or more embodiments, a command can be entered by a user in a virtual chat communication session. Commands would comprise keywords which cause a particular action by the support agent (for example, keyword "balance" would display the user's account balance). Users may routinely misspell keywords when entering commands in the virtual chat communication session. A misspelled keyword in a command can be automatically corrected and the command can then be executed. In order to ensure that the misspelled keyword is corrected properly, a minimum number of letters must match between the misspelled keyword and a candidate keyword that the misspelled keyword can be corrected into. This provides greater accuracy and customization.

Figure 8:
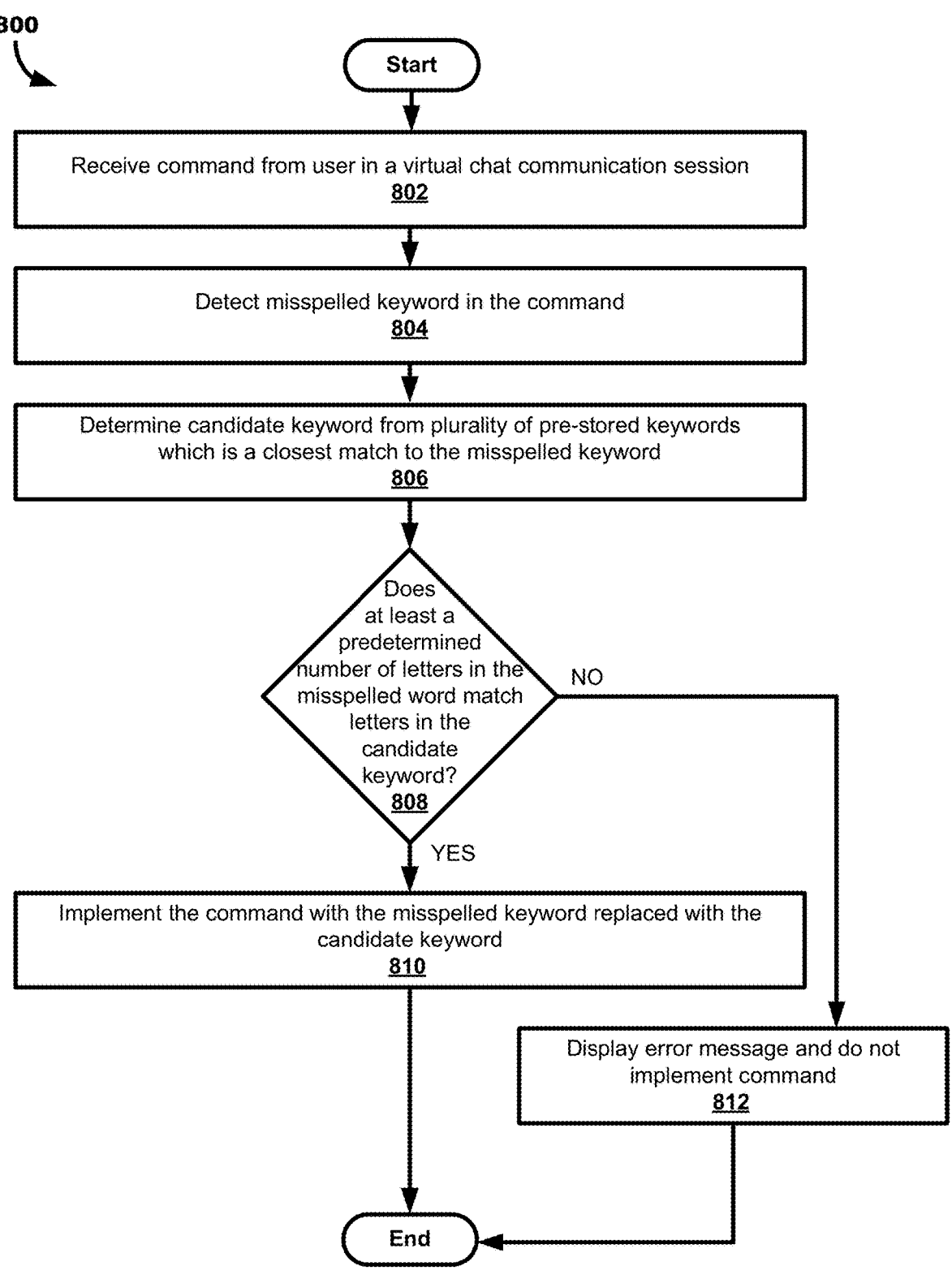
FIG. 8 illustrates a computer-implemented method for implementing a virtual chat communication session with automated keyword correction, in accordance with one or more embodiments set forth and described herein.
Figure 9:
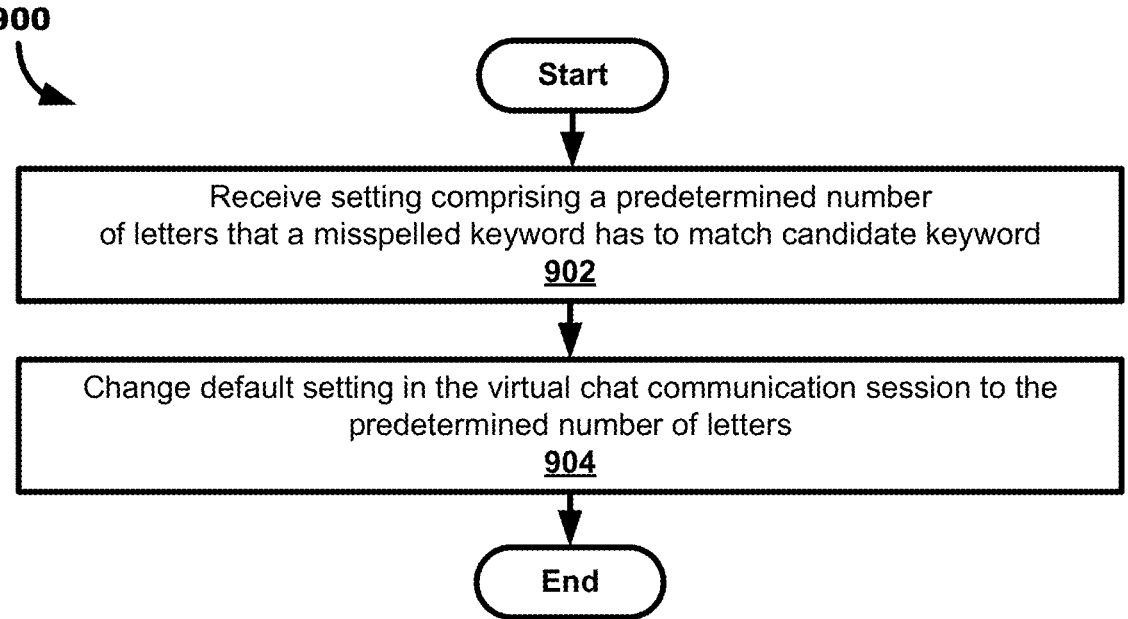
FIG. 9 illustrates a computer-implemented method for implementing a virtual chat communication session with customization of a predetermined number of letters to trigger automated keyword correction, in accordance with one or more embodiments set forth and described herein.

Illustrated examples in FIG. 8-9 set forth computer-implemented methods 800, 900. In one or more examples, the respective flowcharts of the computer-implemented methods 800, 900 may be implemented by the one or more processors 210 of the one or more financial institution servers 200. In particular, the computer-implemented method 1200 may be implemented as one or more modules in a set of logic instructions stored in a non-transitory machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FP-GAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. It is noted that the computer-implemented methods 800, 900 are typically entirely implemented electronically without the need for a human agent.

As illustrated in FIG. 8, a computer-implemented method is shown for implementing a virtual chat communication session with automated keyword correction, in accordance with one or more embodiments set forth and described herein.

In illustrated process block 802, during a virtual chat communication session on the client device 100, a user command is received/acquired. The user command can be typed or entered in the chat box 701 on the chat interface 700 on the client device 100. The command is then transmitted by the client device to the one or more processors 210 of the one or more financial institution servers 200. The computer implemented method 800 can proceed to illustrated process block 804, which, contemporaneously with receiving the command in illustrated process block 802, on the one or more processors 210 of the one or more financial institution servers 200, detects a misspelled keyword in the command received in illustrated process block 802. The detection can be performed by maintaining a list of pre-stored keywords and comparing all keyword(s) in the command to the list of valid keywords. When there is a keyword that is not an exact match, this is considered to be a misspelled keyword. It is noted that not all words in the command may be keywords, for example, some words can be personalized information such as account numbers, etc. The NLP parses through the command and would identify only all of the keywords therein which are checked to see if they are present in the list of pre-stored keywords. Words in the command that are not keywords are not checked. If all keywords in the command are present in the list of pre-stored keywords, then no misspelled keyword is detected and the computer-implemented method 800 can end.

The computer-implemented method 800 can then continue to illustrated process block 806, with the one or more processors 210 of the one or more financial institution servers 200 determining which of the keywords in the list of pre-stored keywords is the closest match to the misspelled keyword. This can be done by counting the number of matching letters between the misspelled keyword and each keyword in the list of pre-stored keywords and the closest match is the keyword in the list of pre-stored keywords with the most matching letters. If there is a tie for the closest match, then the keyword that is used with the highest frequency can be used as the closest match. A candidate keyword is the keyword in the list of pre-stored keywords that is the closest match to the misspelled keyword. The computer-implemented method can then proceed to illustrated decision block 808 which determines whether at least a predetermined number of letters in the misspelled word matches letters in the candidate keyword. If the misspelled word does not have at least a predetermined number of matching letters in the candidate keyword, then the method 800 proceeds to illustrated process block 812 which displays (on behalf of the support agent) in the virtual chat communication session an error message. The error message can be, for example, "we do not recognize that keyword." Then the method would end.

If in illustrated decision block 808 the misspelled word does have at least a predetermined number of matching letters in the candidate keyword, then the method 800 proceeds to illustrated process block 810 which implements the command with the misspelled word replaced with the candidate keyword. For example, if the command was "blance for checking account" the command would be corrected to "balance for checking account" and this corrected command is then executed as if the user typed in the corrected command in the virtual chat communication session.

Note that in an alternative embodiment, in illustrated decision block 808, instead of determining whether a predetermined number of letters match between the misspelled keyword and the candidate keyword, a percentage out of the number of letters in the misspelled keyword (or the candidate keyword) can be used. For example, the percentage can be set at 80 percent (although this can be set to any other number). A misspelled keyword, for example, can be "morgtage pyment" which was intended by the user to be the keyword "mortgage payment." The misspelled keyword contains 14 letters (spaces can be excluded from being counted as a character or alternatively they can be counted as a character), and 80% of 14 equals 11.2 (which can be rounded to 11), so the predetermined number of letters would be 11. In other words, in illustrated decision block 808, there would nee to be at least a match of 11 letters between the misspelled keyword and the candidate keyword in order to proceed to automatically correct the misspelled keyword.

Note that in illustrated process blocks 806 and 808, the number of matching letters between two different keywords can be determined using the one or more processors 210 as follows. A number of matching letters can be initialized to zero. The first letter in each keyword can be compared and only if the letter matches, the number of matching letters can be increased by one. Then the second letter in each keyword can be compared, and only if the second letter matches then the number of matching letters can be increased by one, and so on until all of the letters in the first keyword have been compared. The number of matching letters is then the result of the determination of how many letters match between two keywords.

As illustrated in FIG. 9, a computer-implemented method is shown for implementing a virtual chat communication session with customization of a predetermined number of letters to trigger automated keyword correction, in accordance with one or more embodiments set forth and described herein. in illustrated process block 902, a setting is received from a user during a virtual chat communication system comprising a predetermined number of letters in a misspelled keyword that has to match a candidate keyword in order for the misspelled keyword to be considered the candidate keyword. The user can specify the predetermined number of letters by entering a command in the virtual chat communication session such as "change minimum letter matches to 8" (or any other similar command). The method 900 proceeds to illustrated process block 904, which changes a default setting for the virtual chat communication session to utilize the predetermined number of letters received from the user in illustrated process block 902. The default setting may also apply to all subsequent virtual chat communication sessions for the user. As an alternative to the user setting the predetermined number of letters, an administrator for the one or more financial institution servers 200 can set the predetermined number of letters using a system configuration file or any other mechanism the administrator programs defaults for the system.

Figure 10:
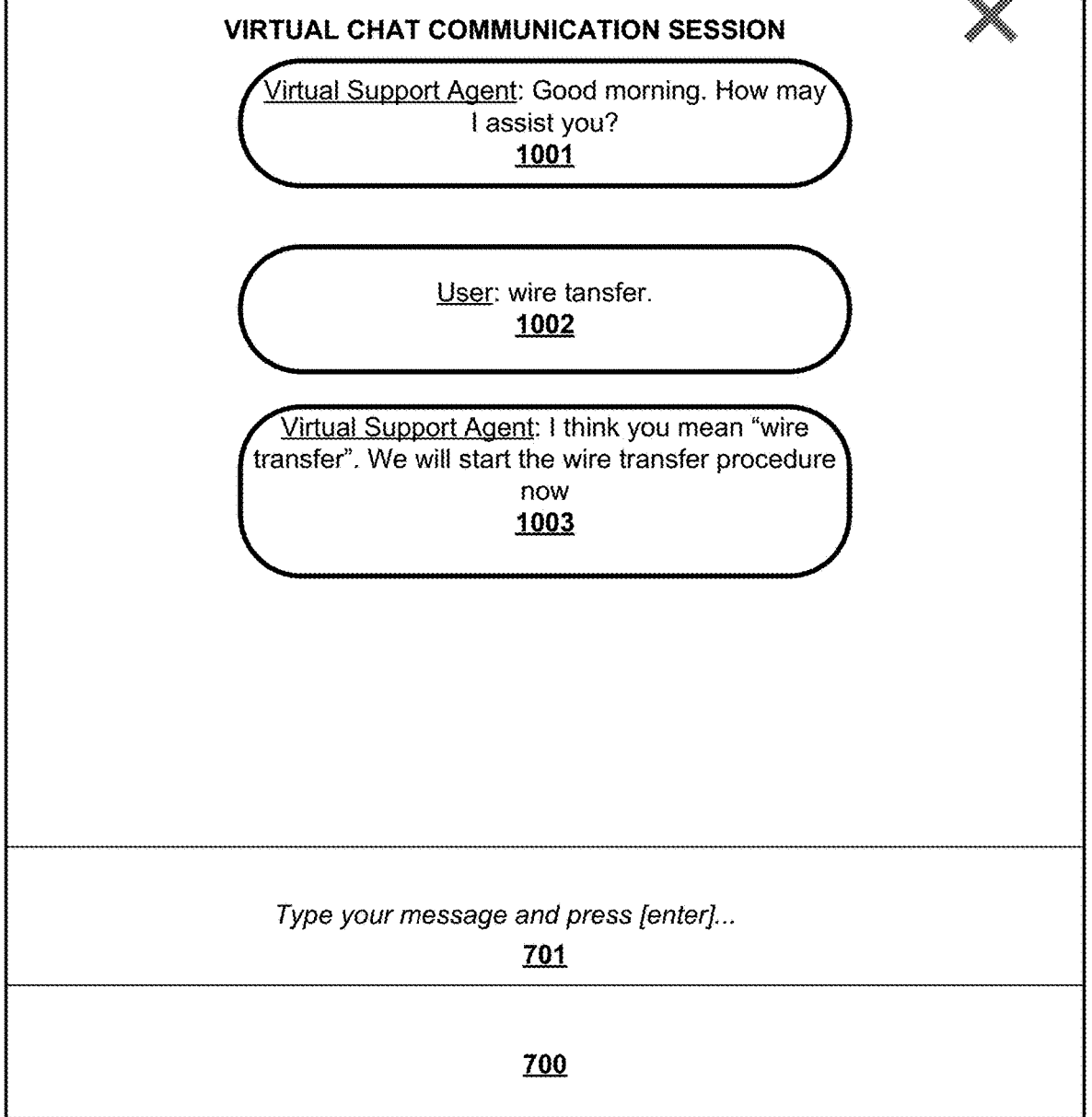
FIG. 10 illustrates a virtual chat communication session between a user and a virtual support agent with the user entering in a misspelled keyword which is automatically corrected, in accordance with one or more embodiments set forth and described herein.

As illustrated in FIG. 10, a virtual chat communication session is shown between a user and a virtual support agent with the user entering in a misspelled keyword which is automatically corrected, in accordance with one or more embodiments set forth and described herein. The one or more processors 210 cause a display of the virtual chat communication session 700 on the GUI on the user interface 131a, 131b of the client device 100. The virtual support agent communicates chat message 1001 (a general greeting). Thereafter, the user enters a command in the chat box 701 which appears as chat message 1002 (see FIG. 8, illustrated process block 802 and its accompanying description). The command contains a misspelled keyword "tansfer." In response to receiving the command, the one or more processors 210 parse the command into keywords and identify if any keywords are misspelled (see FIG. 8, illustrated process block 804 and its accompanying description). In this example, "tansfer" is identified as a misspelled keyword. The one or more processors 210 then determine that the candidate keyword that should be used is "transfer" (see FIG. 8, illustrated process blocks 806-810 and their accompanying description). The virtual support agent then communicates a message 1003 to the user that the misspelled keyword has been corrected and the processing of the command will proceed.

Figure 11:
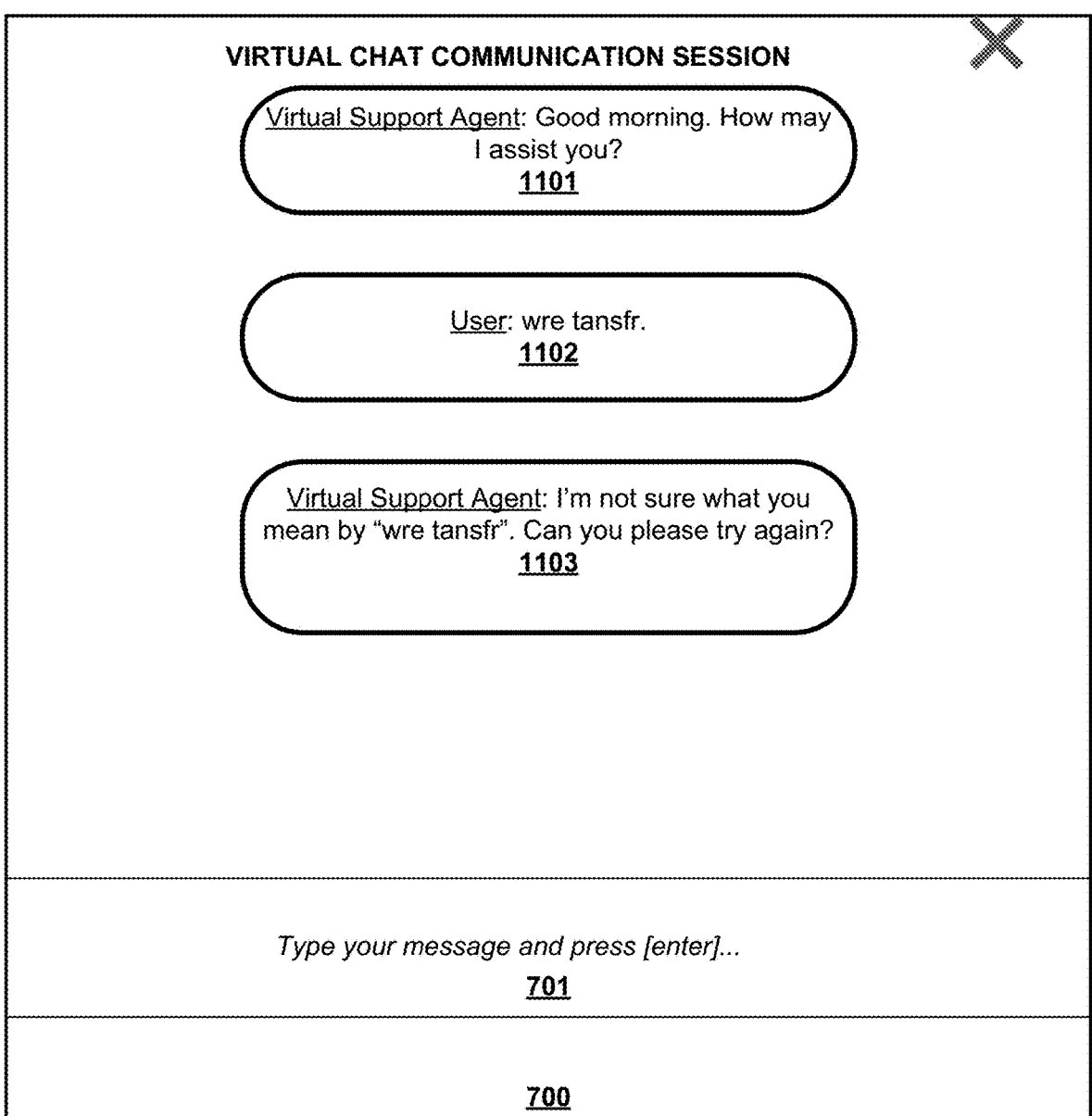
FIG. 11 illustrates a virtual chat communication session between a user and a virtual support agent with the user entering in a misspelled keyword which is rejected, in accordance with one or more embodiments set forth and described herein.

As illustrated in FIG. 11, a virtual chat communication session is shown between a user and a virtual support agent with the user entering in a misspelled keyword which is rejected, in accordance with one or more embodiments set forth and described herein. The one or more processors 210 cause a display of the virtual chat communication session 700 on the GUI on the user interface 131a, 131b of the client device 100. The virtual support agent communicates chat message 1101 (a general greeting). Thereafter, the user enters a command in the chat box 701 which appears as chat message 1102 (see FIG. 8, illustrated process block 802 and its accompanying description). The command contains a misspelled keyword "wre tansfr." In response to receiving the command, the one or more processors 210 parse the command into keywords and identify if any keywords are misspelled (see FIG. 8, illustrated process block 804 and its accompanying description). In this example, "wre tansfr" is identified as a misspelled keyword. The one or more processors 210 then determine that the misspelled keyword is significantly misspelled and as such no processing will proceed (see FIG. 8, illustrated process blocks 806, 808, 812 and their accompanying description). The virtual support agent then communicates an error message 1103 to the user which identifies a misspelled keyword and invites the user to try again. No action is taken in response to the misspelled keyword in this example.

Figure 12:
FIG. 12 illustrates a virtual chat communication session between a user and a virtual support agent with the user setting the minimum number of matching letters, in accordance with one or more embodiments set forth and described herein.

As illustrated in FIG. 12, a virtual chat communication session is shown between a user and a virtual support agent with the user setting the minimum number of matching letters, in accordance with one or more embodiments set forth and described herein. The one or more processors 210 cause a display of the virtual chat communication session 700 on the GUI on the user interface 131a, 131b of the client device 100. The virtual support agent communicates chat message 1201 (a general greeting). Thereafter, the user enters a command in the chat box 701 which appears as chat message 1202 (see FIG. 9, illustrated process block 902). The command instructs the virtual support agent to change a setting for the minimum number of matching letters to be 8. The higher the minimum number of letters, the more accurate the automatic correction will be but the automatic correction will occur less frequently. The lower the minimum number of letters, the less accurate the automatic correction will be but the automatic correction will occur more frequently. So, the user can set the minimum number of letters as to the user's preference. The virtual support agent then communicates a confirmation message 1203 to the user which confirms that the virtual chat communication session now has its default minimum number of letters changed. As an alternative to entering a number, the user can also enter a percentage, the percentage would be the minimum percent of letters in each misspelled keyword that would have to match the respective candidate keyword in order for the candidate keyword to be utilized and the command to proceed. The command entered in the chat box 701 to set a percentage can be, for example, "set the minimum percentage of matching letters to be 80%."

In accordance with one or more embodiments set forth, described, and/or illustrated herein, the client device 100 and the one or more financial institution servers 200 could function in a fully virtualized environment. A virtual machine is where all hardware is virtual and the operation is run over a virtual processor. The benefits of computer virtualization have been recognized as greatly increasing the computational efficiency and flexibility of a computing hardware platform. For example, computer virtualization facilitates multiple virtual computing machines to execute on a common computing hardware platform. Similar to a physical computing hardware platform, virtual computing machines include storage media, such as virtual hard disks, virtual processors, and other system components associated with a computing environment. For example, a virtual hard disk can store the operating system, data, and application files for a virtual machine. Virtualized computer system includes computing device or physical hardware platform, virtualization software executing on hardware platform, and one or more virtual machines executing on hardware platform by way of virtualization software. Virtualization software is therefore logically interposed between the physical hardware of hardware platform and guest system software executing "in" virtual machine.

Memory of the hardware platform may store virtualization software and guest system software executing in virtual machine. Virtualization software performs system resource management and virtual machine emulation. Virtual machine emulation may be performed by a virtual machine monitor (VMM) component. In typical implementations, each virtual machine (only one shown) has a corresponding VMM instance. Depending on implementation, virtualization software may be unhosted or hosted. Unhosted virtualization software generally relies on a specialized virtualization kernel for managing system resources, whereas hosted virtualization software relies on a commodity operating system: the "host operating system," such as Windows or Linux to manage system resources. In a hosted virtualization system, the host operating system may be considered as part of virtualization software.

The system and method described herein may be at least partially processor-implemented, the one or more processors 210 being an example of hardware. For example, at least some of the operations of the computer-implemented methods may be performed by the one or more processors 210 or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors 210, not only residing within a single machine, but deployed across a plurality of machines. In some example embodiments, the one or more processors 210 or processor-implemented modules may be located in a single geographic location (e.g., within a home environment, an office environment, or a server farm). In other example embodiments, the one or more processors or processor-implemented modules may be distributed across a plurality of geographic locations.

Devices that are described as in "communication" with each other or "coupled" to each other need not be in continuous communication with each other or in direct physical contact, unless expressly specified otherwise. On the contrary, such devices need only transmit to each other as necessary or desirable, and may actually refrain from exchanging data most of the time. For example, a machine in communication with or coupled with another machine via the Internet may not transmit data to the other machine for a long period of time (e.g. weeks at a time). In addition, devices that are in communication with or coupled with each other may communicate directly or indirectly through one or more intermediaries.

The terms "coupled," "attached," or "connected" may be used herein to refer to any type of relationship, direct or indirect, between the components in query, and may apply to electrical, mechanical, fluid, optical, electromagnetic, electromechanical, or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action may occur, either in a direct or indirect manner.

Those skilled in the art will appreciate from the foregoing description that the broad techniques of the exemplary embodiments may be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A server computing system, comprising:
one or more processors; and
a non-transitory memory coupled to the one or more processors, the non-transitory memory including a set of instructions of computer-executable program code, which when executed by the one or more processors, causes the server computing system to:
initiate a dedicated process by displaying a chat interface on a user interface of an authenticated client device executing an enterprise mobile application or enterprise desktop application to facilitate a virtual chat communication session between a user and a chatbot;
receive, from the authenticated client device via the chat interface, a user command;
parse, using a machine learning (ML) module executing a trained ML model and contemporaneously with the virtual chat communication session, the user command to determine constituent words of the user command;
process, using the trained ML model contemporaneously with the virtual chat communication session, the constituent words to determine a set of keywords from the constituent words;
determine, using the trained ML model contemporaneously with the virtual chat communication session, a corresponding valid keyword from a plurality of pre-stored keywords for each of the set of keywords while disregarding other portions of the constituent words;
detect, using the trained ML model contemporaneously with the virtual chat communication session, a misspelled keyword from the set of keywords based on a comparison with the corresponding valid keyword;
determine, using the ML module executing the trained ML model contemporaneously with the virtual chat communication session in response to detecting the misspelled keyword, a candidate keyword out of the plurality of pre-stored keywords which is a closest match out of the plurality of pre-stored keywords to the misspelled keyword;
determine, contemporaneously with the virtual chat communication session, whether at least a predetermined number of letters in the misspelled keyword match the predetermined number of letters in the candidate keyword;
replace, responsive to determining that at least the predetermined number of letters in the misspelled keyword match the predetermined number of letters in the candidate keyword and contemporaneously with the virtual chat communication session, the misspelled keyword in the user command with the candidate keyword to generate a corrected command; and
cause, responsive to determining that at least the predetermined number of letters in the misspelled keyword match the predetermined number of letters in the candidate keyword and contemporaneously with the virtual chat communication session, implementation of the corrected command.

2. The server computing system of claim 1, wherein the predetermined number of letters is at least 80% of a number of letters in the misspelled keyword.

3. The server computing system of claim 1, wherein the trained ML model is configured to:

process the constituent words to determine personalized information words from the constituent words, wherein the personalized information words are disregarded when the trained ML model determines corresponding valid keywords for each of the set of keywords.

4. The server computing system of claim 1, wherein the set of instructions, which when executed by the one or more processors, causes a display of the candidate keyword on the chat interface.

5. The server computing system of claim 1, wherein the set of instructions, which when executed by the one or more processors, enables the user to enter a configuration command in the chat interface to set the predetermined number of letters.

6. The server computing system of claim 1, wherein the set of instructions, which when executed by the one or more processors, causes the server computing system to select, responsive to determining that more than one keyword out of the plurality of pre-stored keywords qualify as a closest match to the misspelled keyword, a particular keyword out of the plurality of pre-stored keywords that is used with a highest frequency as the candidate keyword.

7. The server computing system of claim 1, wherein the set of instructions, which when executed by the one or more processors, causes the server computing system to set the predetermined number of letters as a default setting for further virtual chat communication sessions.

8. A computer program product comprising at least one non-transitory computer readable medium having a set of instructions of computer-executable program code, which when executed by one or more processors of a server computing system, causes the server computing system to:

initiate a dedicated process by displaying a chat interface on a user interface of an authenticated client device executing an enterprise mobile application or enterprise desktop application to facilitate a virtual chat communication session between a user and a chatbot;

receive, from the authenticated client device via the chat interface, a user command;

parse, using a machine learning (ML) module executing a trained ML model and contemporaneously with the virtual chat communication session, the user command to determine constituent words of the user command;

process, using the trained ML model contemporaneously with the virtual chat communication session, the constituent words to determine a set of keywords from the constituent words;

determine, using the trained ML model contemporaneously with the virtual chat communication session, a corresponding valid keyword from a plurality of pre-stored keywords for each of the set of keywords while disregarding other portions of the constituent words;

detect, using the trained ML model contemporaneously with the virtual chat communication session, a misspelled keyword from the set of keywords based on a comparison with the corresponding valid keyword;

determine, using the ML module executing the trained ML model contemporaneously with the virtual chat communication session in response to detecting the misspelled keyword, a candidate keyword out of the plurality of pre-stored keywords which is a closest match out of the plurality of pre-stored keywords to the misspelled keyword;

determine, contemporaneously with the virtual chat communication session, whether at least a predetermined number of letters in the misspelled keyword match the predetermined number of letters in the candidate keyword;

replace, responsive to determining that at least the predetermined number of letters in the misspelled keyword match the predetermined number of letters in the candidate keyword and contemporaneously with the virtual chat communication session, the misspelled keyword in the user command with the candidate keyword to generate a corrected command; and cause, responsive to determining that at least the predetermined number of letters in the misspelled keyword match the predetermined number of letters in the candidate keyword and contemporaneously with the virtual chat communication session, implementation of the corrected command.

9. The computer program product of claim 8, wherein the predetermined number of letters is at least 80% of a number of letters in the misspelled keyword.

10. The computer program product of claim 8, wherein the trained ML model is configured to:

process the constituent words to determine personalized information words from the constituent words, wherein the personalized information words are disregarded when the trained ML model determines corresponding valid keywords for each of the set of keywords.

11. The computer program product of claim 8, wherein the set of instructions, which when executed by the one or more processors, causes a display of the candidate keyword on the chat interface.

12. The computer program product of claim 8, wherein the set of instructions, which when executed by the one or more processors, enables the user to enter a configuration command in the chat interface to set the predetermined number of letters.

13. The computer program product of claim 8, wherein the set of instructions, which when executed by the one or more processors, causes the server computing system to select, responsive to determining that more than one keyword out of the plurality of pre-stored keywords qualify as a closest match to the misspelled keyword, a particular keyword out of the plurality of pre-stored keywords that is used with a highest frequency as the candidate keyword.

14. The computer program product of claim 8, wherein the set of instructions, which when executed by the one or more processors, causes the server computing system to set the predetermined number of letters as a default setting for further virtual chat communication sessions.

15. A computer implemented method for implementation by a server computing system, the computer-implemented method comprising:

initiating a dedicated process by displaying a chat interface on a user interface of an authenticated client device executing an enterprise mobile application or enterprise desktop application to facilitate a virtual chat communication session between a user and a chatbot;

receiving, from the authenticated client device via the chat interface, a user command;

parsing, using a machine learning (ML) module executing a trained ML model and contemporaneously with the virtual chat communication session, the user command to determine constituent words of the user command;

processing, using the trained ML model contemporaneously with the virtual chat communication session, the constituent words to determine a set of keywords from the constituent words;

determining, using the trained ML model contemporaneously with the virtual chat communication session, a corresponding valid keyword from a plurality of pre-stored keywords for each of the set of keywords while disregarding other portions of the constituent words;

detecting, using the trained ML model contemporaneously with the virtual chat communication session, a misspelled keyword from the set of keywords based on a comparison with the corresponding valid keyword;

determining, using the ML module executing the trained ML model contemporaneously with the virtual chat communication session in response to detecting the misspelled keyword, a candidate keyword out of the plurality of pre-stored keywords which is a closest match out of the plurality of pre-stored keywords to the misspelled keyword;

determining, contemporaneously with the virtual chat communication session, whether at least a predetermined number of letters in the misspelled keyword match the predetermined number of letters in the candidate keyword;

replacing, responsive to determining that at least the predetermined number of letters in the misspelled keyword match the predetermined number of letters in the candidate keyword and contemporaneously with the virtual chat communication session, the misspelled keyword in the user command with the candidate keyword to generate a corrected command; and causing, responsive to determining that at least the predetermined number of letters in the misspelled keyword match the predetermined number of letters in the candidate keyword and contemporaneously with the virtual chat communication session, implementation of the corrected command.

16. The computer implemented method of claim 15, wherein the predetermined number of letters is at least 80% of a number of letters in the misspelled keyword.

17. The computer implemented method of claim 15, wherein the trained ML model is configured to:

process the constituent words to determine a set of keywords and personalized information words from the constituent words, wherein the personalized information words are disregarded when the trained ML model determines corresponding valid keywords for each of the set of keywords.

18. The computer implemented method of claim 15, further comprising causing a display of the candidate keyword on the chat interface.

19. The computer implemented method of claim 15, further comprising enabling the user to enter a configuration command in the chat interface to set the predetermined number of letters.

20. The computer implemented method of claim 15, further comprising, responsive to determining that more than one keyword out of the plurality of pre-stored keywords qualify as a closest match to the misspelled keyword, selecting a particular keyword out of the plurality of pre-stored keywords that is used with a highest frequency as the candidate keyword.

\* \* \* \* \*